United States Patent
Kocher et al.

[15] 3,663,891
[45] May 16, 1972

[54] CELL FOR USE IN A CIRCULATING LIQUID LASER

[72] Inventors: Robert C. Kocher, Great Neck; Harold Samelson, Sea Cliff, both of N.Y.

[73] Assignee: GTE Laboratories Incorporated

[22] Filed: June 12, 1970

[21] Appl. No.: 45,821

[52] U.S. Cl. .......................... 331/94.5, 356/246, 250/218
[51] Int. Cl. ..................... H01s 3/05, H01s 1/04, G01n 1/10
[58] Field of Search ................. 331/94.5; 356/246; 250/218

[56] References Cited

OTHER PUBLICATIONS

Samelson et al., " High Energy Pulsed Liquid Laser," Semi-annual Tech. Summary Report Jan. 1 to June 30, 1968, July 31, 1968, AD 672323, pp. 1– 36.

*Primary Examiner*—William L. Sikes
*Assistant Examiner*—R. J. Webster
*Attorney*—Irving M. Kriegsman

[57] ABSTRACT

A cell for use in a circulating liquid laser comprising an elongated cylindrical active region and an input and an output chamber mounted coaxially at opposite ends of the active region. A window is positioned coaxially in each chamber. Liquid active material entering the input chamber flows around the window so that large scale disturbances which may exist in the entering liquid are smoothed prior to the liquid entering the active region.

11 Claims, 3 Drawing Figures

Patented May 16, 1972

3,663,891

INVENTORS.
HAROLD SAMELSON
ROBERT KOCHER

BY

R. J. Frank
ATTORNEY.

CELL FOR USE IN A CIRCULATING LIQUID LASER

BACKGROUND OF THE INVENTION

The invention relates to lasers and in particular to cells for lasers which utilize a flowing liquid as the active material.

Solids, gases and liquids have been used as active materials in lasers. Lasing is initiated by raising the energy levels of the atoms in the active material from the level which they normally occupy to a higher energy level or excited state. This process of excitation is generally accomplished in a liquid laser by a high intensity light source. As hereinafter used, the term "active material" shall refer only to a liquid active material.

When the atoms of the active material are in an excited state, they can be stimulated to emit a photon by interacting with an incident photon. As a result, the incoming photon, or wave, is augmented by the one given up by the excited atom. The released wave falls in phase with the wave that triggered its release. Hence, an amplifying action ensues.

In order to sustain laser operation, the laser cell must be part of a resonant cavity having at least two separated reflecting walls, one of which is partially transmissive. The wave caused by the release of the photon from the atom in the excited state must travel a path which is substantially parallel to the axis of the resonant cavity so that it can be repeatedly reflected through the active material. As the wave travels through the material it stimulates more atoms to release photons which further amplifies and reinforces the wave. Each time the wave is reflected at the partially transmissive reflecting surface, a small portion of it passes through this surface. This small portion constitutes the laser output beam.

Two desirable properties of the laser output beam are coherence and collimation. Optical distortion of the laser output beam shall herein be taken to mean an impairment of either of these properties. The optical characteristic of the liquid active material which primarily determines the quality of the output laser beam is the uniformity of the refractive index of the liquid, which in turn is dependent upon the uniformity of liquid temperature and density. One of the difficulties associated with the use of a liquid as an active material for a laser is that large amounts of heat may be unevenly absorbed by the liquid during excitation. This tends to cause a non-uniform change in the density and temperature and consequently of the refractive index of the liquid causing optical distortion of the laser output beam and a decrease in the output energy of the laser.

When a static laser (i.e. one in which the liquid is not flowing through the cell) is excited, a large percentage of the input energy from the excitation source is absorbed by the liquid at the periphery of the cell. This causes the cell to have a relatively cool inner core of liquid surrounded by a warmer outer cylinder of liquid. The warm outer cylinder of liquid has a lower density than the cooler inner core; therefore the index of refraction of the liquid is lower at the periphery of the cell than at the center. As the temperature of the cell returns to equilibrium, diffusion of the warmer and cooler liquids occurs as a result of the thermal and density gradients throughout the cell with the result that the index of refraction of the liquid varies. If an attempt is made to excite the laser during this time, a wave which is traveling through the active material will be refracted in the direction of higher refractive index as it passes through the liquid. Thus the wave will follow a path which is at an angle to the axis of the resonant cavity. This wave will either leave the resonant cavity before the repeated reflections necessary to sustain laser operation can occur or cause the laser output beam to diverge or lose coherence. The resultant laser output beam will be optically distorted and have a relatively lower output energy. Further attempts to excite the laser result in a further decrease in output energy and an increase in optical distortion until there is a complete loss of laser output. Typically, between 10 and 30 minutes are required for the static laser to return to equilibrium conditions. Therefore a relatively long time must elapse between successive excitations of the static laser.

The requirement for a liquid laser which is capable of either high pulse repetition rate or continuous operation led to the development of the flowing liquid laser wherein the liquid active material flows continuously through the laser cell. In the flowing laser, substitution of the liquid flowing into the cell for the liquid which had previously been excited tends to maintain isothermal conditions in the liquid and the cell with the result that the flowing liquid laser can be excited more frequently than the static laser. However, if the flow of liquid through the cell is laminar a velocity gradient will exist, with the liquid at the periphery of the cell moving slower than the liquid at the central portion of the cell. When the laser is excited, the temperature of the slower moving liquid is raised to a higher temperature than that of the faster moving liquid. This results in the warmer portion of the liquid having a lower density and consequently a lower index of refraction than the relatively cooler portion of the liquid. The differences in the index of refraction within the liquid cause waves which have been emitted by excitation of the active material and which are travelling in different portions of the active material to be refracted at different angles as they pass through the liquid, a result similar to that obtained with the static laser. Thus, while higher pulse repetition rates are obtainable the laser output beam still contains undesirable optical distortion.

Since the optical distortion of the laser output beam is caused primarily by the unequal liquid velocities in the cell, it appeared that this distortion could be substantially eliminated by creating a more uniform liquid velocity. This can be accomplished merely by increasing the flow rate of the liquid through the cell until the flow becomes turbulent. In addition, to creating nearly uniform velocity, turbulent flow also increases the mixing of the warmer and cooler liquid layers within the cell with the consequence of further reducing temperature inhomogeneities therein. It was expected that waves travel in different portions of the active material of the cell under these conditions would travel in substantially parallel paths thereby producing an output beam of relatively high output power and relatively low distortion. However, even under turbulent flow conditions, relatively high distortion was found to exist in the laser output beam. Accordingly, we have invented a cell for use in a liquid laser, which has the advantages of using a flowing liquid as the active material while substantially reducing the adverse optical effects found in previous lasers employing liquid active materials.

SUMMARY OF THE INVENTION

The present invention relates to a cell for a laser which utilizes a flowing liquid as the active material.

Liquid active material entering the cell may be subject to eddying and other large scale disturbances due to the abrupt change in the dimensions of the flow passage and the change in the direction of the liquid flow. These large scale disturbances cause variations in the index of refraction of the liquid to occur. Light waves which have been emitted by excitation of the active material and which are traveling through the cell will be refracted at various angles upon passing through these large scale disturbances in the liquid thereby causing distortion in the laser output beam. The cell of this invention substantially reduces the optical distortion of the laser output beam by preventing these large scale disturbances in the liquid flow from interfering with the waves traveling through the active material.

The cell comprises an active region having a longitudinal axis and an input chamber coupled to the active region. Flow control means located within the input chamber maintains the active material apart from the longitudinal axis in and adjacent to the input chamber thereby permitting any large scale disturbances which may be present in the entering liquid to be smoothed when the active material is proximate the active region. Thus, the laser output beam is not appreciably distorted by the large scale disturbances in the active material entering the cell.

In one embodiment of the invention, the flow control means is transparent and comprises a cylindrical portion and a frusto-conical portion having a common longitudinal axis. The frusto-conical portion has a first and a second base with the first base having a larger diameter than the second base. The first base of the frusto-conical portion is joined to one end of the cylindrical portion. The flow control means is positioned in the input chamber coaxially with the longitudinal axis of the active region with the second base of the frusto-conical portion adjacent the active region.

Light waves which have been emitted by excitation of the active material and which are travelling through the cell proximate to the longitudinal axis of the cell are transmitted through the transparent flow control means while the liquid active material in the input chamber flows around the periphery of the flow control means. Large scale disturbance in the active material entering the cell are smoothed while the liquid flows around the flow control means thereby preventing these disturbances from causing distortion in the output laser beam.

Further features and advantages of the invention will become more readily apparent from the following detailed description of a specific embodiment of the invention when taken in conjunction with the accompanying drawings.

DESCRIPTION OF THE PREFERRED EMBODIMENT

Figure 1:
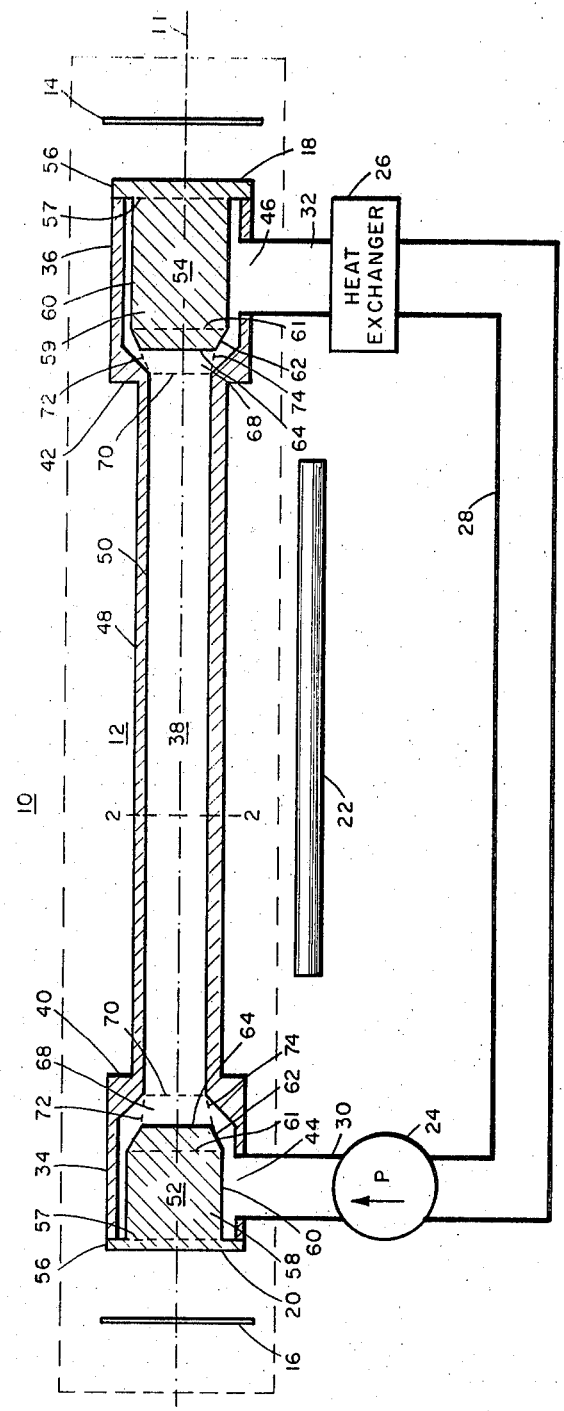
FIG. 1 is a representation of a flowing liquid laser utilizing the cell of this invention.

Referring now to FIG. 1 there is shown a schematic representation of a circulating liquid laser. A circulating liquid laser is one in which the liquid active material continuously flows through a closed system. The liquid active material is an inorganic solution of a compound containing an active ion, an inorganic solvent and a Lewis acid. Although many such solutions may be employed, in the preferred form of the invention the active ion is tri-valent neodymium, the inorganic solvent is phosphorus oxychloride and the Lewis acid is zirconium tetrachloride. This solution is represented by the formula $POCl_3:ZrCl_4^{+3}$. $POCl_3:ZrCl_4:Nd^{+3}$ may be prepared by the following procedure:

Five grams of neodymium oxide powder, $Nd_2O_3$, are added to a solvent consisting of 84 cubic centimeters of anhydrous phosphorus oxychloride and 16 cubic centimeters of zirconium tetrachloride. Approximately 1 cubic centimeter of distilled water is then slowly stirred into the mixture whereupon the $Nd_2O_3$ dissolves in the solution. When the $Nd_2O_3$ is fully dissolved, essentially all hydrogen-containing species are removed by boiling off approximately two-thirds of the total volume in a standard distillation apparatus equipped with a dessicating agent to maintain an anhydrous atmosphere. The resultant gel can then be diluted to a total volume of 100 cubic centimeters with anhydrous phosphorus oxychloride to provide a 0.3 M solution. Additional details concerning the preparation of a liquid active material utilizing phosphorus oxychloride as an inorganic solvent may be found in the U.S. Pat. No. 3,558,504 issued Jan. 26, 1971, and assigned to the same assignee as this application.

The circulating liquid laser consists of a resonant cavity 10 having a longitudinal axis 11 and containing a cell 12 and mirrors 14 and 16 located adjacent the opposite end of laser cell 12. Mirrors 14 and 16 may either be mounted externally to cell 12, as shown in FIG. 1, or may take the form of reflective coatings placed directly on the end faces 18 and 20 of the cell. One of the mirrors, for example, mirror 14, is totally reflective, i.e. it reflects substantially all of the light impinging upon it. The other mirror, mirror 16, is only partially reflective in that it reflects only a portion of the light impinging upon it while permitting the remainder of the light to be transmitted there through as the output beam of the laser.

Excitation means in the form of light source 22, positioned in close proximity to cell 12 provides a source of excitation energy to the active material flowing through the cell. The light source may take the form of a high pressure Xenon filled lamp which is controlled by an external circuit (not shown). The walls of cell 12 are constructed of quartz or other material which transmits radiation with negligible attenuation at the frequency required to excite the active material.

The laser further comprises a centrifugal pump 24 for circulating the liquid active material through the laser and heat exchanger 26 which cools the liquid after it flows out of cell 12. Lines 28, 30 and 32 interconnect pump 24, heat exchanger 26 and cell 12.

Figure 2:
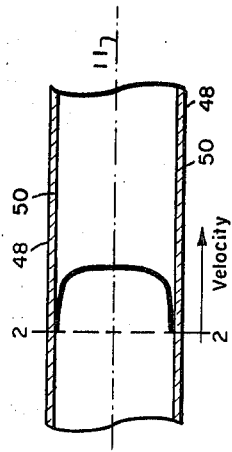
FIG. 2 is a velocity distribution curve of the active material flowing past section 2—2 of FIG. 1 under turbulent flow conditions.

In operation, pump 24 circulates the liquid active material in cell 12 and line 30 at a sufficiently high volume flow rate to produce turbulence in the liquid. Under turbulent flow conditions, the liquid velocity distribution between the walls of a pipe or tube such as cell 12 or line 30 depends upon the strength and extent of the turbulent mixing process. Turbulence causes mixing of the liquid particles in adjacent layers of the liquid thereby producing a homogeneous liquid which tends to move with uniform velocity at a particular cross section of the tube. As shown in FIG. 2, which is a representation of the velocity distribution cross—section 2-2 of FIG. 1 for a liquid flowing through the cell under turbulent conditions, a large radial velocity gradient exists near the cell walls while the velocity is substantially uniform across the greater radial portion of the cell.

A laser output beam is obtained by actuating light source 22. Part of the energy thus produced is absorbed by the liquid active material causing stimulated emission of photons. In addition, the temperature of the active material is raised causing a decrease in the liquid density which results in a decrease in the index of refraction of a liquid.

To obtain minimum distortion in the laser output beam it is necessary that the photons emitted during excitation travel in a path substantially parallel to longitudinal axis 11, so that they can be repeatedly reflected through the active material by mirrors 14 and 16 at the ends of resonant cavity 10. A radial variation in the index of refraction of the liquid in the cell will cause the photons to be refracted resulting in a deviation from this path. With turbulent flow conditions existing in the cell, the mixing of adjacent fluid layers tends to smooth out temperature inhomogeneities which may exist due to differences in the stream velocities. Thus, turbulent flow in the cell results in a substantially uniform index of refraction in the radial direction. Photons traversing the active material therefore travel paths substantially parallel to the longitudinal axis of the cell which should result in an output laser beam having low optical distortion. The large velocity gradient which exits near the cell wall may give rise to a large temperature gradient. Generally this non-uniform velocity exists close to the cell wall and therefore does not effect the photon stream which is traversing the cell in a region adjacent the longitudinal axis where the index of refraction is relatively uniform.

It was found that creating turbulent flow conditions in the liquid active material alone did not significantly decrease the optical distortion of the laser output beam. This may be explained as follows: under turbulent flow conditions, small scale variations in the flow of liquid cause a mixing of the active material as the flow takes place. A rapid and irregular pulsation of velocity both in the direction of motion of the flow and at an angle to this direction occurs at every point in the liquid. The time average of the components of instantaneous velocity in the direction of general liquid motion is equal to the velocity of the fluid. The time average of the components of instantaneous velocity normal to this direction is equal to zero. These small scale variations in the flow of the active material tend to cause a uniform radial velocity of the active material and do not contribute to the optical distortion of the output laser beam. However, liquid entering and leaving the cell is subject to eddying and other large scale disturbances due to the abrupt enlargement of the fluid passageway and change in direction which the liquid must undergo. These large scale disturbances cause the index of refraction of the liquid to vary with the result that photons traversing the cell will be refracted causing optical distortion in the laser output beam. Cell 12 is designed to prevent these large scale disturbances from causing optical distortion of the output laser beam. Referring again to FIG. 1, cell 12 comprises cylindrical input and output chambers 34 and 36, respectively coupled in coaxial relationship to opposite ends of an active region 38; the active region extending along longitudinal axis 11 generally between inner surfaces 40 and 42 of the input and output chambers. Apertures 44 and 46 in the input and output chambers respectively provide openings through which the liquid active material can flow into and out of cell 12, with input chamber 34, active region 38 and output chamber 36 defining a passageway for the flow of active material through the cell.

Cell 12 has an outer surface 48 and an inner surface 50 and can be constructed of either Pyrex glass or quartz. The ratio of the outside diameter of the active region to the inside diameter of the active region is preferrably made approximately equal to the index of refraction of the cell material. For example, if the cell is made from pyrex, this ratio is approximately 1.43. Under these conditions, the energy from the light source will be focused on the liquid active material in the active region of the cell thereby increasing the amount of energy absorbed by the active material.

Figure 1A:
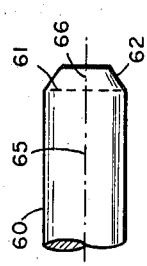
FIG. 1a is a view of a portion of the flow control means of this invention.

Substantially identical windows 52 and 54 coaxially mounted in the input and output chambers respectively are optically transparent at the frequency of the laser output beam. Each window has a first or outer anular section 56 extending between the outer face and dotted lines 57 and having a diameter at least as large as the outside diameter of the chamber to which it is coupled. The remainder of windows 52 and 54 consist of second or flow control portions 58 and 59, respectively consisting of cylindrical inner portion 60, extending between dotted lines 57 and 61, and having a larger diameter than the diameter of the active region and a frusto-conical portion 62 having a first base coincident with line 61 and a second base or inner face 64 having a diameter equal to or somewhat larger than the diameter of the active region. As can be more clearly seen in FIG. 1a which is a representation of a segment of one of the flow control portions of the window, cylindrical portion 60 has a longitudinal axis 65 and frusto-conical portion 62 has an axis 66. The flow control portion of the window is constructed so that axes 65 and 66 are coincident and form a common longitudinal axis. Referring again to FIG. 1, the common longitudinal axis of the flow control portion of the window is positioned in the input chamber coaxially with longitudinal axis 11. A transition region 68 extends between inner face 64 and an area adjacent to the entrance of active region 38.

Window 52 allows the liquid active material to be introduced into the cell without causing distortion of the laser output beam. The flow of liquid entering input chamber 34 may be subject to large scale eddying and other disturbances due to the abrupt enlargement of the flow passageway and change in the direction of flow. These disturbances in the liquid flow will cause the index of refraction of the liquid to vary in a random manner. If these variations occur in the path of the photons, or light waves, travelling in the active material the laser output beam will be distorted. The flow control portion 58 of window 52 prevents these disturbances from causing distortion in the laser output beam. Liquid entering input chamber 34 flows around cylindrical portion 60 of the flow control portion of window 52 while the stream of photons is transmitted through the flow control means adjacent to longitudinal axis 11. Any large scale eddying or other disturbances which may exist in the liquid entering the input chamber are smoothed as the liquid flows around the outside of the inner portion of the window thereby preventing distortion of the output beam.

The flow control portion 59 of window 54 provides a similar function as the active material leaves the active region of the cell. The stream of photons is transmitted through window 54 while the liquid active material flows around the cylindrical portion 60 of the flow control portion of window 54. Any disturbances which may occur in the flow of the active material in the output chamber therefore occur while the liquid is separated from the stream of photons.

It is desirable to have a uniform liquid velocity through input line 30, transition region 68 and active region 38 so that the liquid within the active region is replaced at a constant rate. Also, the flow of active material in input line 30 should be turbulent so that the liquid entering input chamber 34 is well mixed. To meet these two requirements the volume flow rate of the laser liquid must be constant in the input line, transition region and active region. The volume flow rate is dependent upon the velocity of the liquid and the area through which it flows. To maintain a constant liquid velocity, the following are designed to be equal: (1) cross-sectional area of input line 30; (2) cross-sectional area of active region 38 between inner walls 50; and (3) the surface area of the frustum of a cone defined by inner face 64 and dotted lines 70, 72 and 74 in transition regions 68.

The relationship between window 52 and inner surface 50 of the cell wall causes flow separation to occur between the liquid and the inner surface of the cell wall as the active material flows through transition region 68. This also improves the optical properties of the output laser beam as it tends to remove any stagnant layer of liquid which might exist adjacent to inner face 64 of the window. After repeated excitation of the laser, a stagnant layer of liquid in this area would tend to become hotter than the surrounding liquid causing refraction of the photon stream and optical distortion of the output laser beam.

In a typical cell of this invention, the inside diameter of the active region is about 1.59 cm, the axial length of the flow control portion of the window is about 2.5 cm with the diameter of cylindrical portion 60 about equal to 1.9 cm and the diameter of inner face 64 about equal to 1.7 cm. When the flowing active material is $POCl_3:ZrCl_4:Nd^{+3}$ the minimum volume flow rate required to assure turbulent flow in the active region is about 1.96 gal/min. At this volume flow rate laser output is obtained at a pulse repetition rate of approximately two pulses per second with the energy supplied to the light source about equal to 1000 joules.

What is claimed is:

1. In a laser utilizing a flowing liquid as the active laser material, a cell comprising
    a. an active region wherein said active laser material is excited to produce a population inversion in and, thereby optical gain therein, said active region having an inlet and an outlet and a longitudinal axis; and
    b. a liquid flow input chamber having an inlet and an outlet, the outlet of said input chamber being coupled to the inlet of said active region; and
    c. optical means positioned along said axis at each end of said active region for at least coupling laser radiation from said region; and
    d. a first flow control means transparent at the wavelength region in which the optical gain is produced said first flow control means comprising
        1. a cylindrical portion, and
        2. a frusto-conical portion joined to one end of said cylindrical portion, said cylindrical portion and said frusto-conical portion having a common longitudinal axis, said flow control means positioned in said input chamber coaxially with the longitudinal axis of said active region.

2. The cell of claim 1 wherein said frusto-conical portion of said first flow control means is positioned adjacent the inlet of said active region thereby forming a transition region between the input chamber and the active region, the volume flow rate of the active material through said transition region being equal in magnitude to the volume flow rate of active material through said active region.

3. The cell of claim 2 further comprising
   a. an output chamber having an inlet and an outlet, the inlet of said output chamber being coupled to the outlet of said active region; and
   b. second flow control means transparent at the wavelength of the excited photons and having a longitudinal axis, said second flow control means being positioned within said output chamber with the longitudinal axis of said second flow control means coaxial with the longitudinal axis of said active region, said second flow control means separating said stream of photons and said active material in said output chamber.

4. In a laser utilizing a flowing liquid as the active material, a cell comprising:
   a. an active region wherein said active material is excited to produce a population inversion and, thereby, optical gain therein said active region being in the form of an elongated hollow cylinder having an inlet and an outlet and a longitudinal axis; and
   b. input and output chambers in the form of cylinders, each of said chambers having an inlet and an outlet, said chambers being positioned coaxially adjacent the inlet and outlet respectively of said active region; and
   c. first and second flow control means, each of said flow control means comprising:
      1. a cylindrical portion, and
      2. a frusto-conical portion having a first and a second base, said first base having a diameter substantially equal to the diameter of said cylindrical potion of said flow control means and being greater than the diameter of said second base, said first base of said frusto-conical portion joined to said cylindrical portion thereby forming said flow control means having a common longitudinal axis, said first and second flow control means positioned coaxially within said input and output chambers respectively with said second base of said frusto-conical portions adjacent to said active region.

5. A laser utilizing a flowing liquid as the active material, comprising:
   a. a cell having an active region in the form of an elongated hollow cylinder and cylindrically shaped input and output chambers positioned coaxially adjacent the opposite ends of said active region, said input and output chambers each having a port therein; and
   b. first and second flow control means, each of said flow control means comprising a cylindrical portion and a frusto-conical portion, said frusto-conical portion having a first and second base, said first base having a diameter substantially equal to the diameter of said cylindrical portion and being greater than the diameter of said second base, said first base of said frusto-conical portion joined to said cylindrical portion thereby forming said flow control means, said flow control means having a common longitudinal axis, said first and second flow control means positioned coaxially within said input and output chambers respectively with said second bases of said frusto-conical portions adjacent to said active region; and
   c. optical means positioned along said axis at each end of said active region for at least coupling laser radiation from said region; and
   d. a light pump optically coupled to said active region, said light pump being actuated to provide energy to the active material in said active region to produce a population inversion and, thereby, optical gain therein;
   e. pump means having an inlet and an outlet, the outlet of said pump means being coupled to the port in said input chamber of said cell, said pump means causing said liquid active material to flow in said laser.

6. The laser of claim 5 further comprising a heat exchange means having an inlet and an outlet, the inlet of said heat exchange means being coupled to the port in said output chamber and the outlet of said heat exchange means being coupled to the inlet of said pump means thereby forming a closed loop for circulating the liquid active material in said laser.

7. The cell of claim 13 wherein said frusto-conical portion has a first and a second base, said first base having a diameter substantially equal to the diameter of said cylindrical portion of said flow control means and being greater than the diameter of said second base, said first base of said frusto-conical portion joined to said cylindrical portion thereby forming said flow control means, said flow control means having a common longitudinal axis, said flow control means positioned within said input chamber coaxially with the longitudinal axis of said active region with said second base of said frusto-conical portion adjacent to said active region.

8. The cell of claim 7 further comprising an input port coupled to the inlet of said input chamber, said liquid active material entering said input chamber through said input port, said frusto-conical portion of said flow control means positioned adjacent to said active region thereby forming a transition region therebetween, the cross-sectional area of said input port, the cross sectional area of said active region and the surface area of said transition region being equal.

9. The laser of claim 5 wherein the optical means further comprises an optical resonant cavity positioned along said longitudinal axis adjacent the opposite ends of said active region for providing stimulated emission of radiation from said active region.

10. The laser of claim 4 wherein the optical means further comprises an optical resonant cavity positioned along said longitudinal axis adjacent the opposite ends of said active region for providing stimulated emission of radiation from said active region.

11. The laser of claim 1 wherein the optical means further comprises an optical resonant cavity positioned along said longitudinal axis adjacent the opposite ends of said active region for providing stimulated emission of radiation from said active region.

* * * * *